May 30, 1967 — L. J. LOVISEK — 3,322,019
PLASTERBOARD SCREW
Filed July 28, 1964
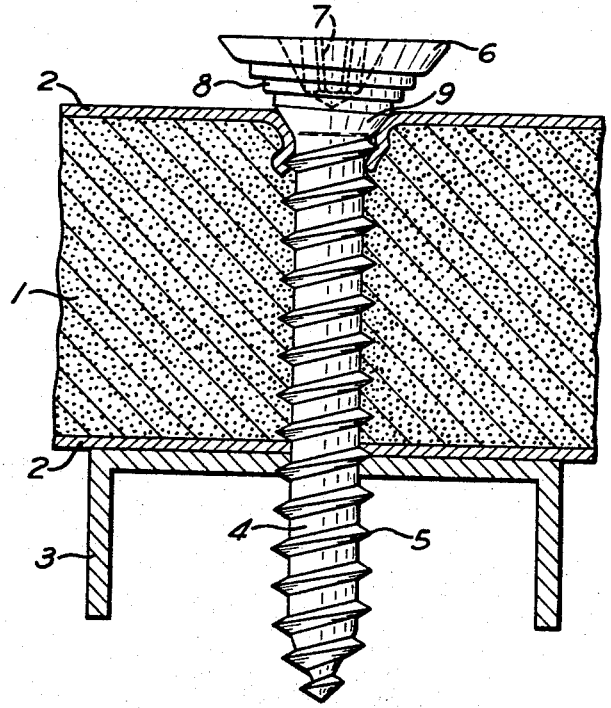
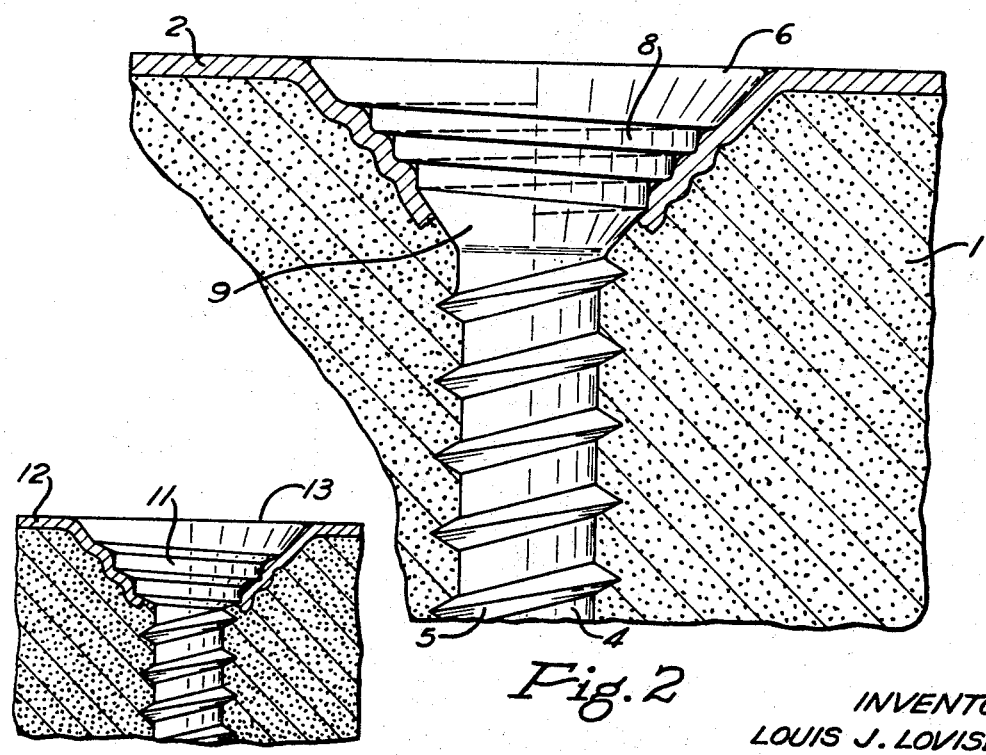
INVENTOR.
LOUIS J. LOVISEK
BY
Brown, Critchlow, Flick & Peckham
ATTORNEYS.

United States Patent Office 3,322,019
Patented May 30, 1967

---

3,322,019
PLASTERBOARD SCREW
Louis J. Lovisek, Cheshire, Conn., assignor to Screw and Bolt Corporation of America, Pittsburgh, Pa., a corporation of Pennsylvania
Filed July 28, 1964, Ser. No. 385,718
5 Claims. (Cl. 85—46)

This invention relates to screws for fastening plasterboard to supports.

In attaching plasterboard to supporting members by means of screws, the heads of the screws are likely to tear the paper covering of the plaster or cause frayed edges of it to project out around the edges of the screw heads. The object of this invention is to provide a screw that will not have those objections.

The preferred embodiment of the invention is illustrated in the accompanying drawings, in which FIG. 1 is a side view of a screw with its head partially projecting from a plasterboard being fastened to a support;

FIG. 2 is a fragmentary enlarged side view of the screw, showing its head completely embedded in the plasterboard; and FIG. 3 is a side view of the head of a modified screw in plasterboard.

Referring to FIG. 1 of the drawings, a plasterboard that is formed from any suitable type of plaster 1 sandwiched between two sheets 2 of paper in the usual way is fastened to its support 3 by means of screws. Each screw has a shank 4 provided with a pointed end. The shank may be cylindrical or slightly tapered, the one shown being cylindrical. It is encircled by the usual right-hand thread 5. At the opposite end of the shank there is a tapered head 6, the outer end of which is provided with a kerf or a socket 7 for a screw driver.

It is a feature of this invention that the side of the screw head is provided with a left-hand spiral thread 8. This thread preferably starts a short distance from the outer end of the head and may continue until it reaches the shank of the screw. Or, it may terminate in a shoulder that may be cylindrical. If it ends a short distance from the shank of the screw, the portion 9 of the tapered head between the two threads can be conical and provided with a smooth surface as shown. For best results, the thread around the head is a closed spiral thread, by which is meant that successive convolutions engage each other all around the head and are not separated as the convolutions of thread 5 are shown to be. They form a plurality of adjoining steps. The periphery of the thread may be substantially straight transverse to its length and disposed at substantially a right angle to the surface of the thread that faces the shank of the screw.

As this screw is drawn by its right-hand main thread into the plasterboard, the small conical end 9 of the screw head will approach and finally enter the hole formed by the shank of the screw, as shown in FIG. 1. Following this, the inner end of the left-hand thread 8 will make contact with the paper around the hole formed by the screw. As the rotating screw continues to move forward through the plasterboard, the front face of the left-hand thread will press against the paper progressively around the screw hole and iron it down with a smoothing action, as shown in FIG. 2, so that there will be no frayed edges to project out around the edge of the head. Thread 8 accelerates the rate of smoothing action on the paper because, as the screw is turned, any given area of the paper will be engaged by an area of the thread that moves inward continually closer to the screw shank while at the same time the main thread 5 is pulling the head farther into the plaster.

Other shape screw heads and reverse threads can be used without departing from the scope of this invention. For example, the left-hand thread 11 shown in FIG. 3 will smooth the paper 12 into the hole in the plaster formed by the screw head 13 as the screw is driven into place. The thread in cross section is in the form of a flattened letter V.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A screw for use in plasterboard, said screw having a shank provided with a right-hand thread, and a head at one end of the shank having an underside tapered toward the shank, said underside of the head being provided with a left-hand spiral thread.

2. A screw for use in plasterboard, said screw having a shank provided with a right-hand thread, and a head at one end of the shank having an underside tapered toward the shank, said underside of the head being provided with a left-hand spiral thread terminating short of said end of the shank to provide a smooth conical portion of the head between the two threads.

3. A screw for use in plasterboard, said screw having a shank provided with a right-hand thread, and a head at one end of the shank having an underside tapered toward the shank, said underside of the head being provided with a left-hand closed spiral thread, the convolutions of the spiral thread forming a plurality of adjoining steps around the head.

4. A screw for use in plasterboard, said screw having a shank provided with a right-hand thread, and a head at one end of the shank having an underside tapered toward the shank, said underside of the head being provided with a left-hand closed spiral thread terminating short of said end of the shank to leave a smooth conical portion of the head between the two threads, the convolutions of the spiral thread forming a plurality of adjoining steps around the head.

5. A screw for use in plasterboard, said screw having a shank provided with a right-hand thread, and a head at one end of the shank having an underside tapered toward the shank, said underside of the head being provided with a left-hand closed spiral thread that is V-shape in cross section.

References Cited

UNITED STATES PATENTS

| | | | |
|---|---|---|---|
| 933,865 | 9/1909 | Umholtz | 85—41 |
| 1,151,861 | 8/1915 | Brumback | 85—43 |
| 1,175,665 | 3/1916 | Sweet | 85—43 |
| 2,199,809 | 5/1940 | Pigott | 85—9 |
| 2,959,086 | 11/1960 | Gerlach et al. | 85—43 |
| 3,056,234 | 10/1962 | Nelsson | 52—363 |
| 3,177,755 | 4/1965 | Kahn | 85—41 |

FOREIGN PATENTS

| | | |
|---|---|---|
| 213,464 | 3/1958 | Australia. |
| 513,859 | 6/1955 | Canada. |

CARL W. TOMLIN, *Primary Examiner.*

THOMAS F. CALLAGHAN, *Examiner.*

M. PARSONS, JR., *Assistant Examiner.*